United States Patent
Shimada et al.

(10) Patent No.: US 7,551,828 B2
(45) Date of Patent: Jun. 23, 2009

(54) OPTICAL TRANSMISSION DEVICE FOR CONTROLLING OPTICAL LEVEL OF TRANSMISSION SIGNAL IN OPTICAL TRANSMISSION SYSTEM

(75) Inventors: Yuji Shimada, Kawasaki (JP); Takuji Maeda, Kawasaki (JP); Kouji Nekoda, Fukuoka (JP); Masanori Kondoh, Kawasaki (JP); Taro Asao, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/343,292

(22) Filed: Jan. 31, 2006

(65) Prior Publication Data
US 2007/0053650 A1   Mar. 8, 2007

(30) Foreign Application Priority Data
Sep. 8, 2005   (JP)   ............... 2005-261254

(51) Int. Cl.
G02B 6/00   (2006.01)
H04B 10/00   (2006.01)

(52) U.S. Cl. ............... 385/140; 398/136; 398/137; 398/139

(58) Field of Classification Search ............. 385/140; 398/136, 137, 139, 197
See application file for complete search history.

(56) References Cited

U.S. PATENT DOCUMENTS

| | | | |
|---|---|---|---|
| 6,433,925 B1 | 8/2002 | Sakano et al. | |
| 6,744,964 B1 * | 6/2004 | Vittal | 385/140 |
| 2002/0101651 A1 * | 8/2002 | Dugan et al. | 359/341.1 |
| 2002/0154359 A1 * | 10/2002 | Tsuda et al. | 359/124 |
| 2004/0109661 A1 * | 6/2004 | Bierman et al. | 385/140 |
| 2005/0158057 A1 * | 7/2005 | Tomofuji et al. | 398/160 |

FOREIGN PATENT DOCUMENTS

| | | |
|---|---|---|
| JP | 11-17259 | 1/1999 |
| JP | 2004-147122 | 5/2004 |

* cited by examiner

*Primary Examiner*—Michelle R Connelly Cushwa
*Assistant Examiner*—Rhonda S Peace
(74) *Attorney, Agent, or Firm*—Staas & Halsey LLP (57) ABSTRACT

An optical transmission device includes: an attenuator that attenuates an optical signal before being input into an optical element by a predetermined attenuation amount determined so that a level of an adjustment optical signal input into the optical element falls within a predetermined dynamic range of the optical element; and a controller that adjusts the predetermined attenuation amount so that a level of the optical signal input into the optical element falls within the predetermined dynamic range.

10 Claims, 10 Drawing Sheets

PRIOR ART

PRIOR ART

FIG.7

PRIOR ART

FIG.8

OPTICAL TRANSMISSION DEVICE FOR CONTROLLING OPTICAL LEVEL OF TRANSMISSION SIGNAL IN OPTICAL TRANSMISSION SYSTEM

CROSS-REFERENCE TO RELATED APPLICATIONS

This application is based upon and claims the benefit of priority from the prior Japanese Patent Application No. 2005-261254, filed on Sep. 8, 2005, the entire contents of which are incorporated herein by reference.

BACKGROUND OF THE INVENTION

1. Field of the Invention

The present invention relates to a technology for adjusting an optical level of a transmission signal to an appropriate value in an optical transmission system.

2. Description of the Related Art

Figure 5:
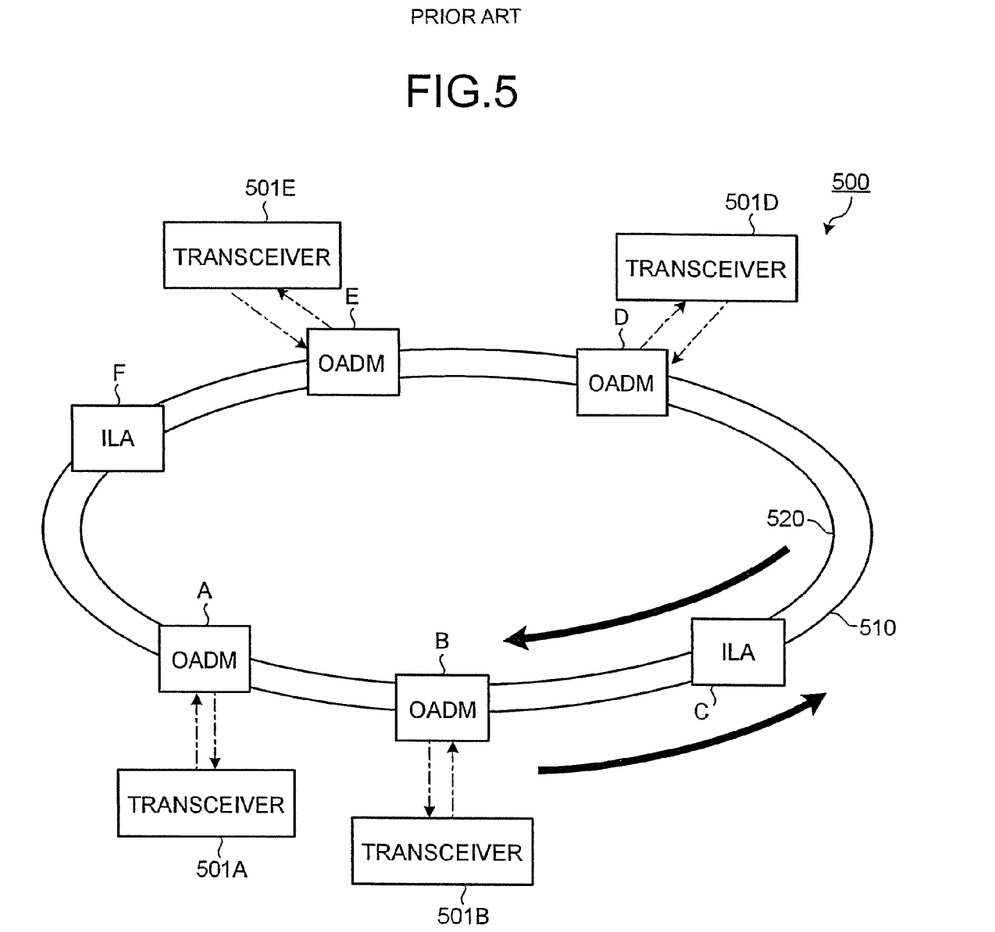
FIG. 5 is an explanatory diagram of the configuration of a conventional optical transmission system.

Recently, by using optical fibers as transmission lines, diffusion of optical transmission systems which transmit optical signals that can increase data capacity by being multiplexed by means of wavelength division multiplexing (WDM) at a high transmission rate instead of electrical signals has been remarkable. FIG. 5 is an explanatory diagram of the configuration of an optical transmission system.

An optical transmission system 500 is provided with optical add and drop multiplexers (OADMs) A, B, E, and D and in-line amps (ILAS: optical repeaters) C and F on a transmission line consisting of an outer ring (upward ring) 510 and an inner ring (downward ring) 520. To the respective OADMs A, B, D, and E, transceivers 501A, 501B, 501D, and 501E are connected, and by adding, dropping and transmitting transmission light through the outer ring 510 and the inner ring 520, optical signals can be transmitted to and received from an arbitrary communications partner. The ILAs C and F amplify WDM light to be transmitted through the outer ring 510 and the inner ring 520. The transmission light to be transmitted through the optical transmission system 500 consists of WDM light obtained by multiplexing an optical signal and optical supervisory channel (OSC) light to supervise the optical signal transmission state.

It is important in the optical transmission system 500 that the optical level of an optical signal composing the WDM light is adjusted to an appropriate value by the OADMs A, B, D, and E and ILAs C and F and transmitted through the outer ring 510 and the inner ring 520.

As a conventional technique to adjust the optical level, a structure is available in that in wavelength multiplexing optical transmission, regardless of the optical input level and the number of wavelengths to an optical fiber amplifier, optical outputs equal among wavelengths are obtained and an optical functional part can be inserted in an intermediate portion. In such a structure, to perform generation avoidance of optical surge and judgment of parts connection becomes an important issue. Therefore, feedback control is performed by inserting a variable attenuator in an optical input unit to make constant optical inputs to the amplifying optical fibers. Furthermore, based on wavelength number data obtained from supervisory signals, control to change a total optical output and optical inputs to the amplifying optical fibers is performed, light to the intermediate optical part and light from the optical part are detected, and when no part is detected, excitation is restrained. A technique to avoid the generation of optical surge when connecting and emit signals indicating that an optical part has not been connected yet by performing the control explained above has been disclosed (see, for example, Japanese Patent Application Laid-Open No. H11-17259).

In addition, there is an example in which an optical wavelength multiplexing network is simply constructed. In this case, it becomes an issue that an optical signal level per channel is kept constant and predetermined transmission quality is maintained. Therefore, a supervisory signal transmitted through an optical fiber transmission line is extracted by a WDM coupler and the number of wavelengths of an optical signal to be input to a remote node is obtained from the supervisory signal. The feedback controller calculates the wavelength number data as a sum of the number of wavelengths obtained from the supervisory signal and the number of wavelengths to be newly inserted at the remote node via a supervisory signal processing circuit. Furthermore, a technique is disclosed in that an attenuation amount of the variable optical attenuator is adjusted so that a value obtained by dividing the total optical power of the optical amplifier by the wavelength number data becomes optical power of an optical signal for a desired channel, whereby always feedback-controlling the attenuation amount of the variable optical attenuator and compensating loss fluctuation of the optical fiber transmission line (see, for example, Japanese Patent Application Laid-Open No. 2004-147122).

Conventionally, as shown in Japanese Patent Application Laid-Open Nos. H11-17259 and 2004-147122, optical level control of an optical signal is performed when starting the optical transmission system 500, and an attenuation amount of a reception unit is adjusted based on wavelength number data of the WDM light acquired by OSC controllers installed inside the OADMs A, B, D, and E and ILAs C and F shown in FIG. 5, whereby controlling to an optimum optical level.

Figure 6:
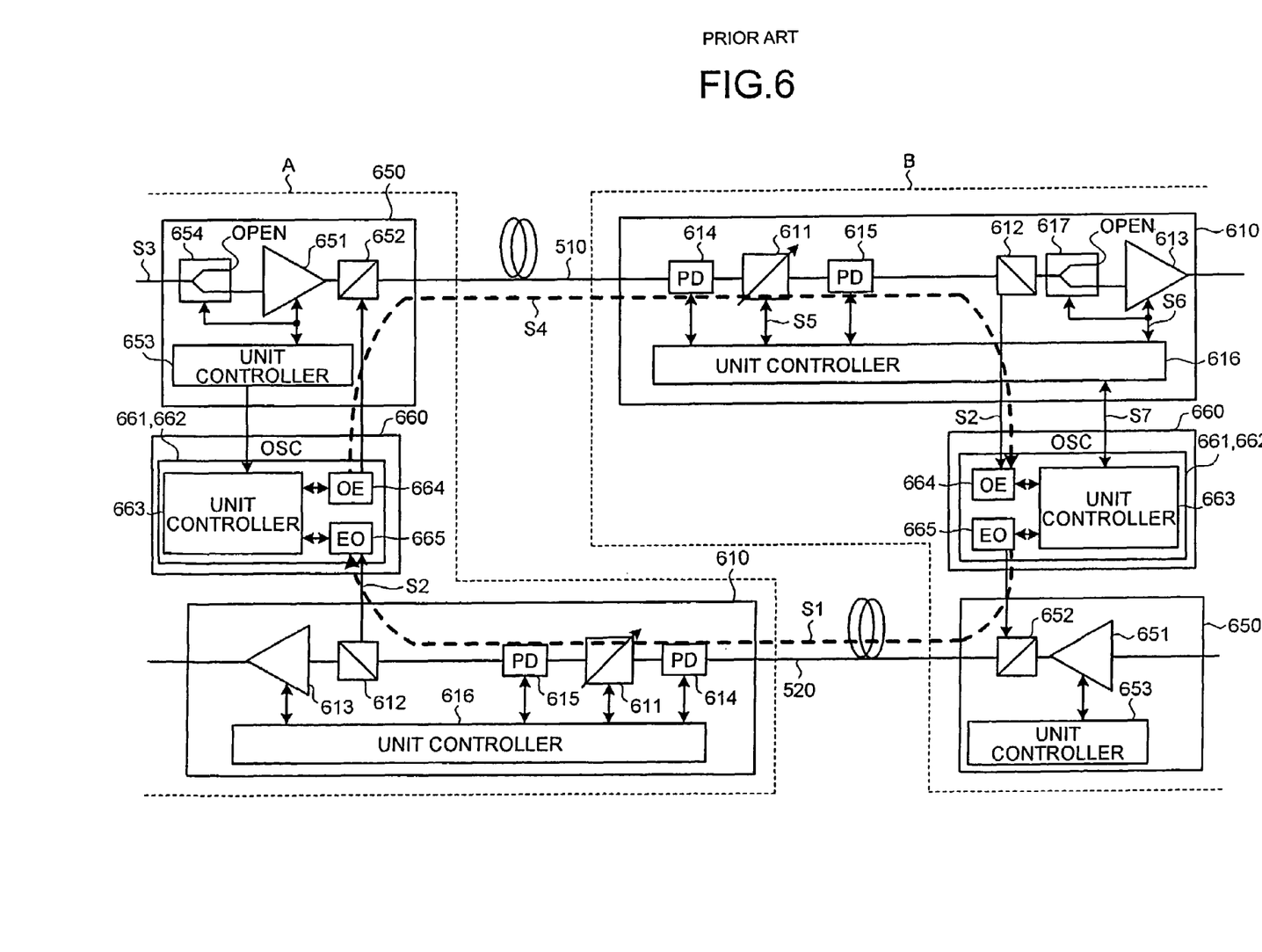
FIG. 6 is an explanatory diagram for explaining starting procedures of the conventional optical transmission system.

An example of a method of adjusting the optical signal level when starting OADMs or ILAs is explained below. FIG. 6 is an explanatory diagram for explaining starting procedures of the optical transmission system. A reception unit 610 includes a front photodiode (PD) 614 and a rear PD 615 in the front and rear of a variable optimal attenuator (VOA) 611. The reception unit 610 and a transmission unit 650 include unit controllers 653. In the reception unit 610, a unit controller 616 adjusts the attenuation amount of the VOA 611 based on optical levels detected by the front PD 614 and the rear PD 615 and controls an optical level of an optical signal to be input into a preamp 613. Furthermore, in the reception unit 610 and the transmission unit 650, the unit controllers 616 and 653 are connected to an OSC controller 660 to adjust the attenuation amount of the VOA 611 when starting.

In FIG. 6, an OR 661 and an OS 662 include a unit controller 663, an optical-electrical converter (OE) 664, and an electrical-optical converter (EO) 665. The unit controller 663 controls the interior of the OSC controller 660. The OE 664 converts an input optical signal into an electrical signal and outputs it. The EO 665 converts an input electrical signal into an electrical signal and outputs it.

Next, starting procedures of the OADM B connected to the outer ring 510 and the inner ring 520 is explained. To start the OADM B, OSC light is transmitted between optical transmission devices adjacent to each other (between OADMs A and B in the example shown in FIG. 6).

First, from the unit controller 663 of the OSC controller 660 of the OADM B, an optical level controlling amplified spontaneous emission (ASE) light output request is output to the unit controller 616 of the OADM A (S1). The optical level of the ASE light requested at this point corresponds to an optical signal 1 wave level. In response to the ASE light output request, to prevent the optical signal from the OADM B from being sent to the transmission line, a 1×2 switch (SW) 617 disposed at the stage before the preamp 613 of the OADM B is controlled to open and shut down the input light to the OADM B.

Next, OSC light communication confirmation is made in the EO 665 of the OADM A and the OE 664 of the OADM B (S2). A postamp 651 that has received the ASE light output request outputs ASE light at a level corresponding to the optical signal 1 wavelength (S3). At this point, to prevent the optical signal from the OADM A from being sent to the transmission line, a 1×2 SW 654 disposed at the stage before the postamp 651 of the OADM A is controlled to open.

When the ASE light is input to the reception unit 610 of the OADM B via the outer ring 510 (S4) and further input into the unit controller 616 via the VOA 611, the VOA 611 is automatically adjusted (S5). Specifically, the unit controller 616 of the OADM B adjusts the VOA 611 to an appropriate attenuation amount by monitoring light receiving power of the rear PD 615 provided at the stage before the preamp 613 so that the input light of the preamp 613 becomes an appropriate level.

When the automatic adjustment of the VOA 611 is ended, the unit controller of the OADM B judges that the input into the preamp 613 has become stable, releases the shut-down state of the preamp 613 of the OADM B (S6), and starts the preamp 613 by means of output constant control (ALC).

When the unit controller 616 of the OADM B confirms that the preamp 613 has started and transited to automatic gain control (AGC), the unit controller stops the ASE light output request for optical level control from the unit controller 663 (S7). When the output of ASE light from the postamp 651 is stopped, the unit controller 653 closes the 1×2 SW 654 disposed at the stage before the postamp 651 of the OADM A, releases the shut-down state of the postamp 651, and starts operation.

The automatic adjustment of the VOA 611 performed at S5 of FIG. 6 means processing to adjust an optical level of an optical signal input in the preamp 613 (ASE light when starting) so as to fall within the dynamic range of the preamp 613.

Figure 7:
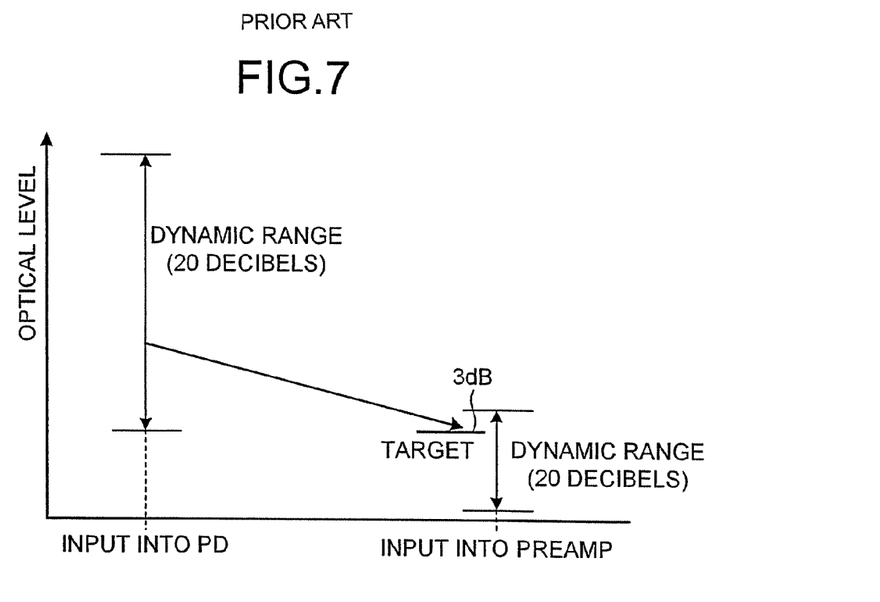
FIG. 7 is an explanatory diagram for explaining a VOA control when starting the optical transmission system.

Herein, the VOA 611 and the dynamic range of the preamp 613 are explained. FIG. 7 is an explanatory diagram for explaining a VOA control when starting the optical transmission system. In FIG. 7, the vertical axis indicates the optical level, and the horizontal axis indicates the time of detection of the optical level indicated on the vertical axis. The PD input time of FIG. 7 indicates an optical level when ASE light is input into the front FD 614 of the reception unit 610. The ASE light to be input into the front PD 614 is controlled to an optical level within a dynamic range (20 decibels) by the optical transmission device of the front stage (OADM A in the example of FIG. 6).

The unit controller 616 adjusts the attenuation amount of the VOA 611 based on detected values of the front PD 614 and the rear PD 615 so that the optical level at the PD input time becomes a target optical level. As the target optical level, an optical level resultant of attenuating 3 decibels from an upper limit of a dynamic range (10 decibels) of the input into the preamp 613 is appropriate. By the adjustment to the target, the attenuation amount of the VOA 611 can be fixed and WDM light at an appropriate optical level can be output from the reception unit 610.

Figure 8:
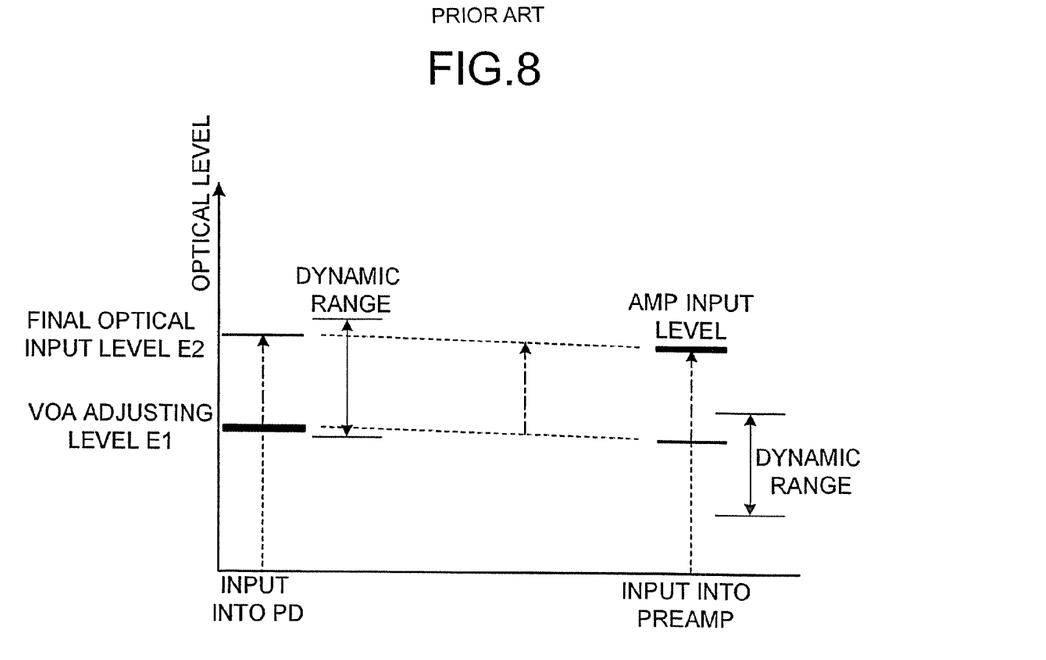
FIG. 8 is an explanatory diagram for explaining a VOA control when an input level of an optical signal rises.

However, as shown in FIG. 7, when an input rise of ASE light for adjustment occurs after adjusting the VOA 611, the preamp 613 does not normally start. FIG. 8 is an explanatory diagram for explaining a VOA control when the input level of the optical signal rises. In FIG. 8, the vertical axis indicates the optical level, and the horizontal axis indicates the time of detection of the optical level indicated on the vertical axis. At the VOA adjusting level E1 indicated on the vertical axis, the optical level input into the PD is attenuated by VOA, and when inputting it into the preamp 613, the optical level is adjusted so as to fall within the dynamic range of the preamp input.

At this point, when the connection of the connector of the cable to input ASE light is insufficient and the connector is properly connected later, the input level of the ASE light may rise. After being adjusted to the VOA adjusting level E1, when the optical level rises to the final optical input level E2, the VOA attenuation amount is adjusted based on the VOA adjusting level E1, so that when being input into the preamp 613, the AMP input level of the optical level of E2 deviates from the dynamic range.

When the input level of the optical signal input into the preamp 613 is out of the dynamic range, the preamp 613 does not start, or when the preamp 613 is in gain constant control, the output of the preamp 613 rises by following input fluctuation and adversely influences the optical signal.

SUMMARY OF THE INVENTION

It is an object of the present invention to at least solve the problems in the conventional technology.

An optical transmission device according to an aspect of the present invention, which adjusts a level of an optical signal input into an optical element having a predetermined dynamic range, includes: an attenuator that attenuates the optical signal before being input into the optical element by a predetermined attenuation amount, wherein the predetermined attenuation amount is determined so that a level of an adjustment optical signal input into the optical element falls within the predetermined dynamic range of the optical element; and a controller that adjusts the predetermined attenuation amount so that a level of the optical signal input into the optical element falls within the predetermined dynamic range of the optical element.

A method according to another aspect of the present invention is a method of adjusting a level of an optical signal input into an optical element having a predetermined dynamic range in an optical transmission device. The method includes: attenuating the optical signal before being input into the optical element by a predetermined attenuation amount, wherein the predetermined attenuation amount is determined so that a level of an adjustment optical signal input into the optical element falls within the predetermined dynamic range of the optical element; and adjusting the predetermined attenuation amount so that a level of the optical signal input into the optical element falls within the predetermined dynamic range of the optical element.

A computer-readable recording medium according to still another aspect of the present invention stores a computer program that causes a computer to execute the above method.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Exemplary embodiments of the present invention are explained in detail with reference to the accompanying drawings.

Figure 1A:
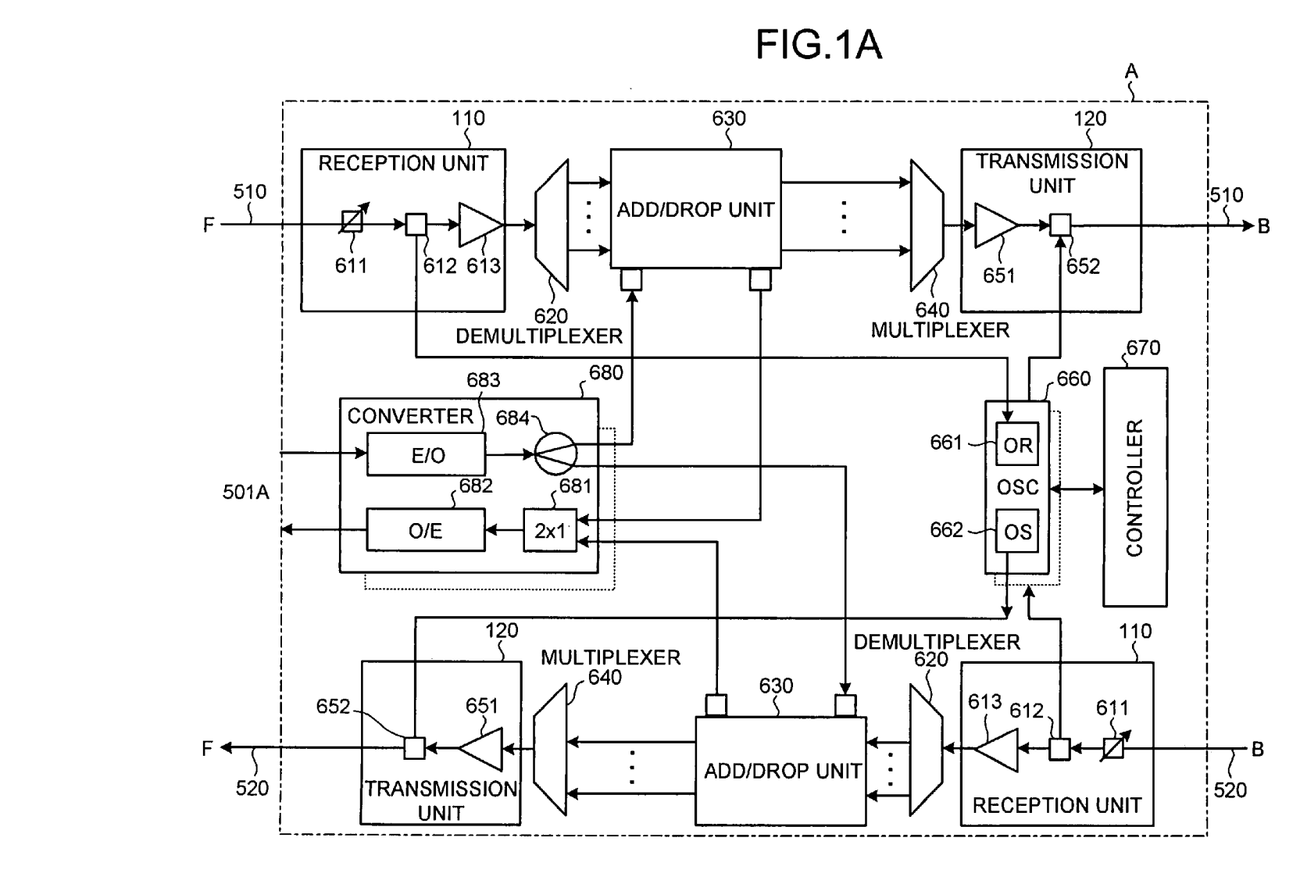
FIGS. 1A and 1B are explanatory diagrams of the configuration of an optical transmission device according to an embodiment of the present invention.

FIG. 1A is an explanatory diagram of the overall configuration of an optical transmission device according to an embodiment of the present invention. The optical transmission device is an optical add and drop multiplexer (OADM) in an optical transmission system, such as the conventional optical transmission system 500 shown in FIG. 5. As shown in FIG. 1A, the OADM includes reception units 110, demultiplexers 620, add/drop units 630, multiplexers 640, and transmission units 120 that are arranged on the outer ring 510 and the inner ring 520, respectively. The OADM further includes an optical supervisory channel (OSC) controller 660, a controller 670, and a converter 680 that are commonly used for an optical transmission on the outer ring 510 and an optical transmission on the inner ring 520.

The reception unit 110 includes the VOA 611, an OSC branching coupler 612, and the preamp 613. A transmission light on the outer ring 510 or inner ring 520 is attenuated by the VOA 611 and then branched into WDM light and OSC light by the OSC branching coupler 612.

The OSC light branched by the OSC branching coupler 612 is input into the OR 661 of the OSC controller 660. The OSC controller 660 remains in a standby mode as long as the OSC light indicates a normal transmission state. On the other hand, when the OSC light indicates a change in the transmission state, such as an abnormality of the transmission line or an increase or decrease in the wavelengths of signals multiplexed into the WDM light, the OSC controller 660 outputs an instruction for coping with the change to the controller 670.

The OSC light indicating the change in the transmission state is output to the transmission unit 120 of the inner ring 520/the outer ring 510, after being branched by the reception unit 110 of the outer ring 510/the inner ring 520 and input into the OSC controller 660. Thus, by outputting the OSC light from the outer ring 510/the inner ring 520 to the inner ring 520/the outer ring 510, the OSC light, which functions as a control signal, is transmitted back to the upstream optical transmission device (such as OADM and ILA). As a use example of the OSC light, there is the starting procedures of the optical transmission system 500 explained above with reference to FIG. 6.

The WDM light branched by the OSC branching coupler 612 is input into the preamp 613. The WDM light is amplified by the preamp 613 and output to the demultiplexer 620. The demultiplexer 620 demultiplexes the WDM light into optical signals of different wavelengths, and outputs the optical signals to the add/drop unit 630.

The add/drop unit 630 branches an optical signal destined to the transceiver 501A from the optical signals input from the demultiplexer 620, and outputs the optical signal to the converter 680. Other optical signals are transmitted as it is and input into the multiplexer 640. On the other hand, an optical signal from the transceiver 501A is input into the add/drop unit 630, through the converter 680, and further input into the multiplexer 640. The multiplexer 640 multiplexes optical signals from the add/drop unit 630 into WDM light, and outputs the WDM light to the transmission unit 120.

The converter 680 includes a 2×1 switch (SW) 681, an optical-electrical converter (OE) 682, an electrical-optical converter (EO) 683, and 1×2 coupler 684. An optical signal, which is destined to the transceiver 501A and included in the WDM light on the outer ring 510 or the inner ring 520, is input into the converter 680 through the add/drop unit 630. The optical signal is input, through the 2×1 SW 681, into the OE 682 that converts the optical signal into an electrical signal and outputs the electrical signal to the transceiver 501A.

On the other hand, when the transceiver 501A transmits an optical signal to another transceiver 501A, an electrical signal from the transceiver 501A is input into the EO 683 of the converter 680 to be converted into an optical signal and output to the 1×2 coupler 684. The 1×2 coupler 684 branches the optical signal from the EO 683 into two, and outputs the optical signals to the add/drop unit 630 on the outer ring 510 and the add/drop unit 630 on the inner ring 520, respectively.

The transmission unit 120 includes the postamp 651 and an OSC multiplexing coupler 652. The WDM light from the multiplexer 640 is input into the postamp 651 that amplifies the WDM light and outputs the amplified WDM light to the OSC multiplexing coupler 652. The OSC multiplexing coupler 652 multiplexes the WDM light from the postamp 651 and the OSC light from the OSC controller 660, and outputs the multiplexed light as a transmission light to the outer ring 510 or the inner ring 520.

The ILA has a similar configuration as that of the OADM explained above, except that the ILA does not include the demultiplexer 620, the add/drop unit 630, the multiplexer 640, and the converter 680. With such a configuration, the ILA does not add/drop optical signals.

Figure 1B:
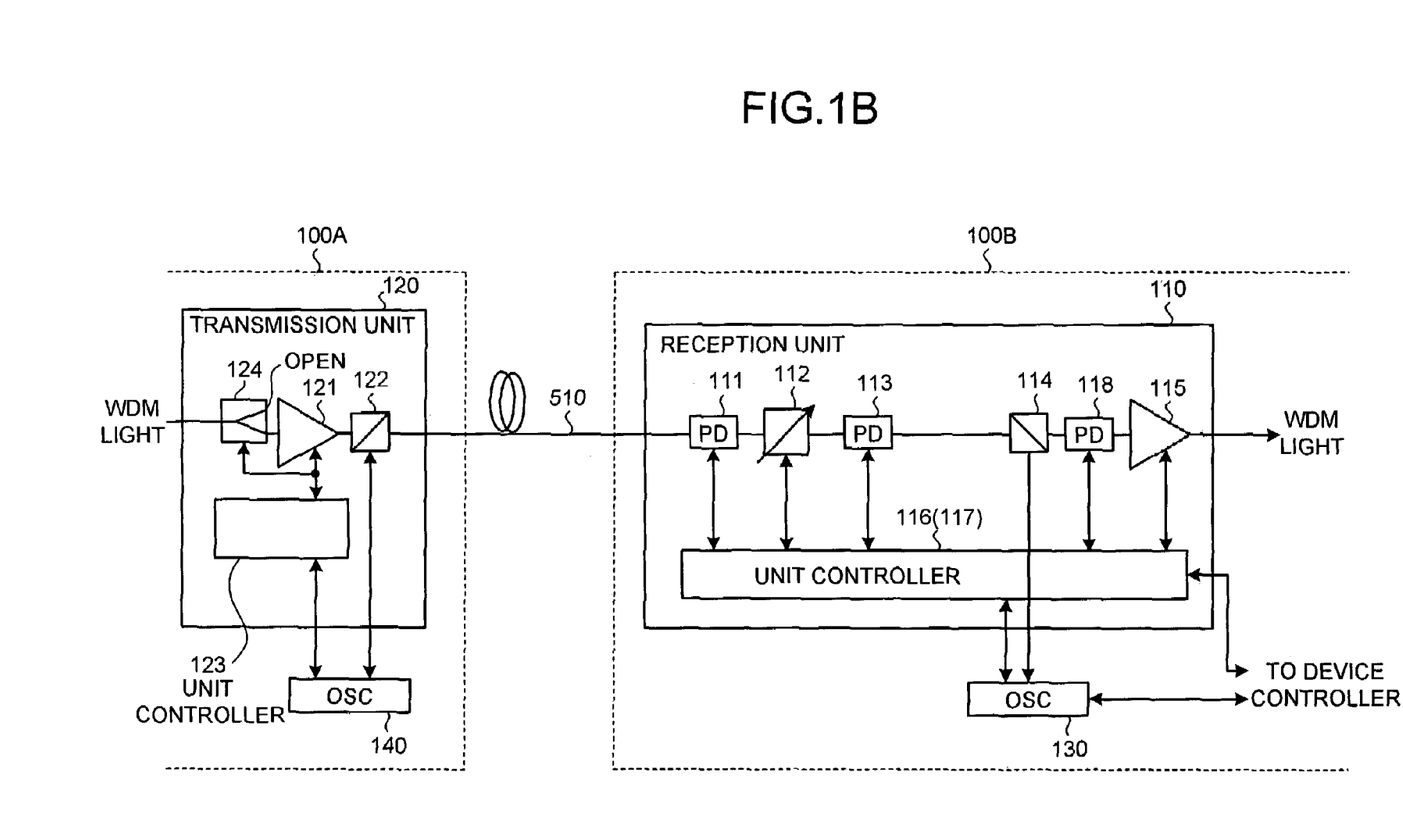

FIG. 1B is an explanatory diagram of the detailed configuration of the optical transmission device. FIG. 1B illustrates a transmission unit 120 of an optical transmission device 100A and a reception unit 110 of an optical transmission device 100B that are connected to each other by the outer ring 510.

As shown in FIG. 1B, the reception unit 110 includes a front PD 111, a VOA 112, a rear PD 113, an OSC branching coupler 114, a PD 118, a preamp 115, an OSC 130, and a unit controller 116/117. The OSC branching coupler 114 and the unit controller 116/117 are connected to the OSC 130.

On the other hand, the transmission unit 120 includes a 1×2 switch (SW) 124, a postamp 121, an OSC multiplexing coupler 122, and a unit controller 123. The unit controller 116 (explained in detail below with reference to FIGS. 3A and 3B) and 117 (explained in detail below with reference to FIGS. 4A and 4B) have a function unique to the present invention, that is, a function of adjusting the attenuation amount of the VOA 112 independently of the OSC 130.

A starting procedure of the optical transmission device 100B shown in FIG. 1B is explained below. The postamp 121 of the optical transmission device 100A outputs an ASE light for optical level adjustment to the optical transmission device 100B, after controlling the 1×2 SW 124, which is arranged upstream of the postamp 121, to open to prevent an optical signal from the optical transmission device 100A from being output to the outer ring 510.

The above process can be performed, for example, by a control signal included in the OSC light that is transmitted from a device controller of the optical transmission device 100B to the optical transmission device 100A. Upon receiving the control signal, a device controller of the optical transmission device 100A sends an instruction to the unit controller 123 to control the 1×2 SW 124 and/or the postamp 121.

The ASE light output from the postamp 121 is input into the reception unit 110 of the optical transmission device 100B. The reception unit 110 adjusts the attenuation amount of the VOA 112 to an appropriate value. Specifically, the PD 118 of the reception unit 110 detects the level of the ASE light input into the preamp 115, and the unit controller 116 compares the detected level with a target input level and adjusts the attenuation amount of the VOA 112 to the appropriate value, that is, a value within the dynamic range of the preamp 115.

Figure 2:
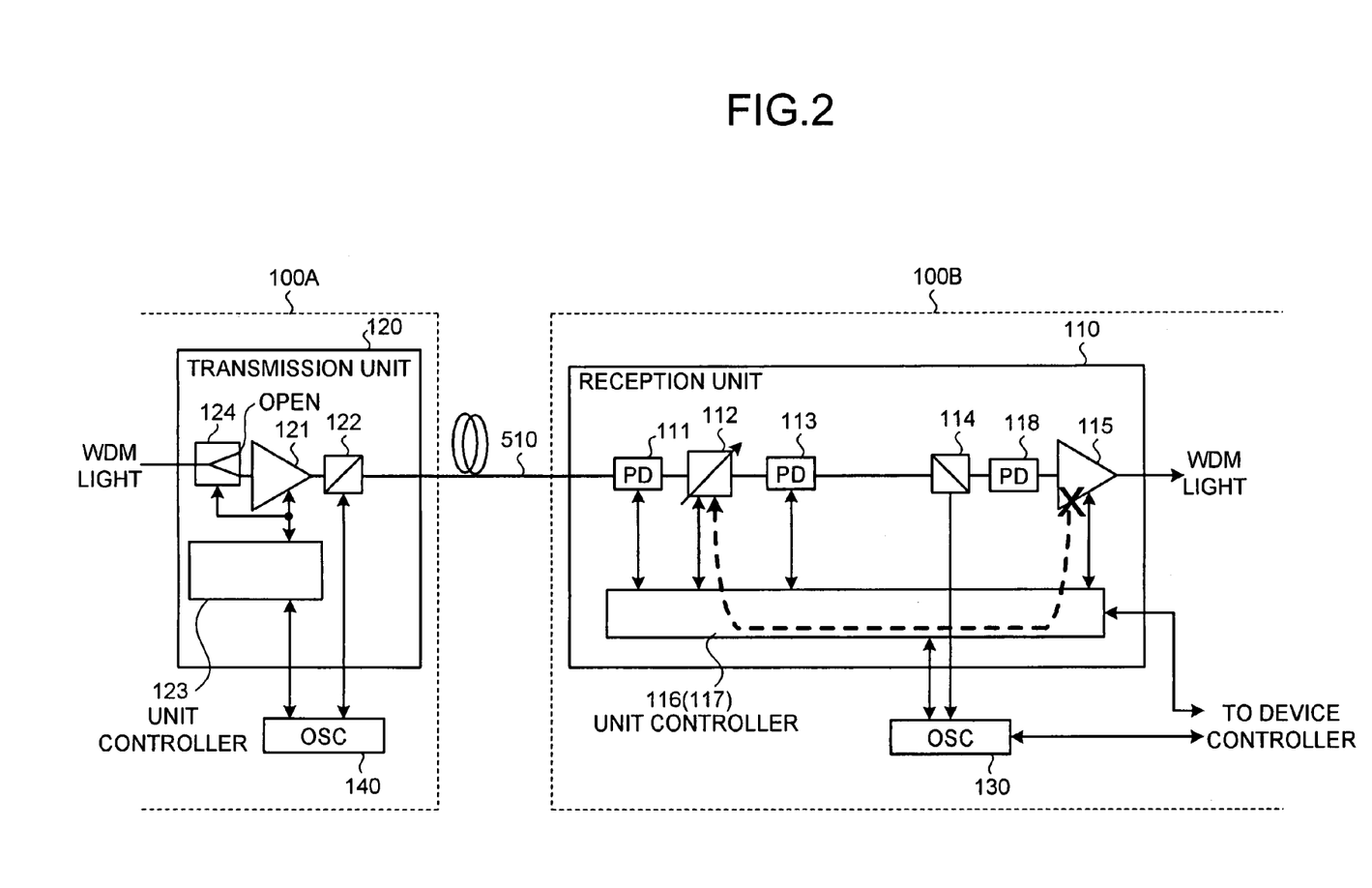
FIG. 2 is an explanatory diagram for explaining a starting abnormality that occurs in the optical transmission device.

FIG. 2 is an explanatory diagram for explaining a starting abnormality that occurs in the optical transmission device. When the input level to the optical transmission device 100B rises after the attenuation amount of the VOA 112 is temporarily fixed by the procedures described above, the optical transmission device 100B detects the rise by the PD 118 arranged upstream of the preamp 115 and re-adjusts the attenuation amount of the VOA 112.

The detection of the rise is performed, for example, in a predetermined time period after adjusting the attenuation amount of the VOA 112 based on the ASE light. When no rise is detected within the time period, the unit controller 116 shifts to ALC control of the preamp 115, which is a next starting procedure.

Figure 3A:
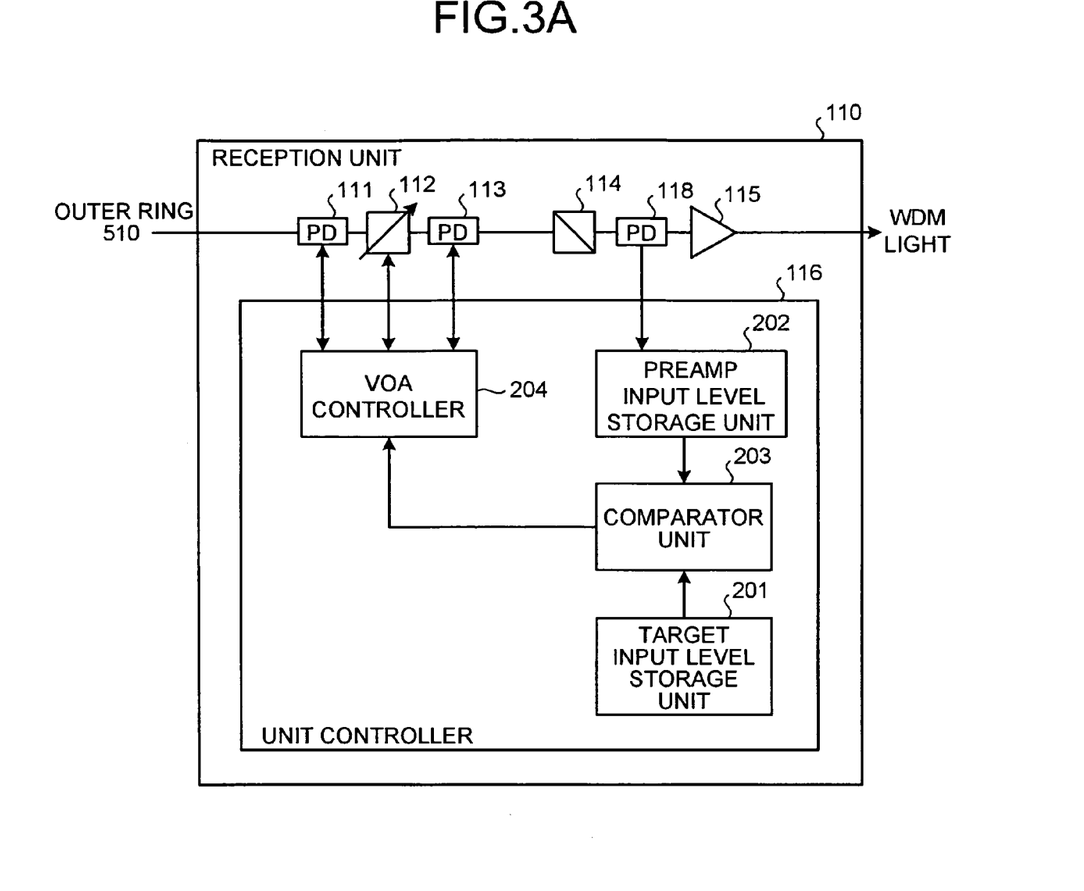
FIG. 3A is an explanatory diagram of the configuration of a unit controller.

FIG. 3A is an explanatory diagram of the configuration of the unit controller 116. As shown in FIG. 3A, the unit controller 116 includes a target input level storage unit 201, a preamp input level storage unit 202, a comparator 203, and a VOA controller 204.

The target input level storage unit 201 stores, as a target input level, an optical level of the ASE light detected by the PD 118 (in other words, input into the preamp 115) when the attenuation amount of the VOA 112 is adjusted based on the ASE light. The target input level storage unit 201 outputs the target input level to the comparator 203.

The preamp input level storage unit 202 stores, as a preamp input level, an optical level of an optical signal detected by the PD 118. Storing of the preamp input level is periodically performed, and the preamp input level stored in the preamp input level storage unit 202 is periodically updated to the latest preamp input level. The preamp input level storage unit 202 outputs the preamp input level to the comparator 203.

The comparator 203 calculates the difference between the target input level input from the target input level storage unit 201 and the preamp input level input from the preamp input level storage unit 202, and judges whether the difference exceeds a predetermined threshold (for example, ±0.5 decibel). The judgment results of the comparator 203 are input into the VOA controller 204.

The VOA controller 204 outputs an adjustment instruction to the VOA 112 according to the judgment results input from the comparator 203.

Figure 3B:
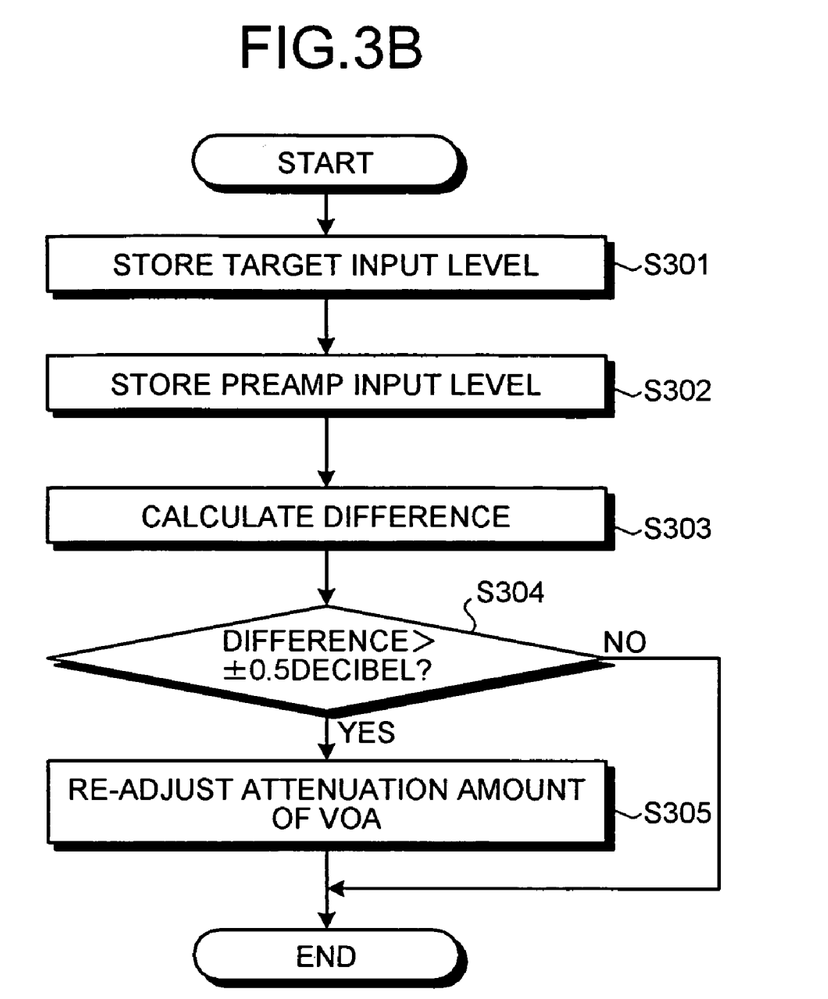
FIG. 3B is a flowchart of a re-adjustment process performed by the unit controller shown in FIG. 3A.

FIG. 3B is a flowchart of a re-adjustment process of the attenuation amount of the VOA 112 performed by the unit controller 116 shown in FIG. 3A. The optical level detected by the PD 118 when the attenuation amount of the VOA 112 is adjusted based on the ASE light is stored in the target input level storage unit 201 (step S301). The preamp input level is periodically stored in the preamp input level storage unit 202 (step S302).

The comparator 203 calculates the difference between the target input level and the preamp input level (step S303), and judges whether the difference exceeds the threshold of ±0.5 decibel (step S304).

The judgment results at step S304 are input into the VOA controller 204, and when the difference is less than or equal to ±0.5 decibel (step S304: No), the process is ended there because the attenuation amount of the VOA 112 is appropriate and therefore does not need to be re-adjusted.

On the other hand, when the difference exceeds ±0.5 decibel (step S304: Yes), the attenuation amount of the VOA 112 is inappropriate and therefore re-adjustment is necessary. Therefore, the VOA controller 204 re-adjusts the attenuation amount of the VOA 112 by outputting a re-adjustment instruction to the VOA 112 (step S305).

Thus, the VOA 112 is re-adjusted by the unit controller 116. Subsequently, as in the same manner as the conventional starting procedures, the shut-down state of the preamp 115 of the optical transmission device 100B is released and the preamp 115 is started. When confirming that the preamp 115 has started, the unit controller 116 stops sending the ASE light output request. When the ASE light stops, the unit controller 123 closes the 1×2 SW 124 arranged upstream of the postamp 121 and starts operation.

Figure 4A:
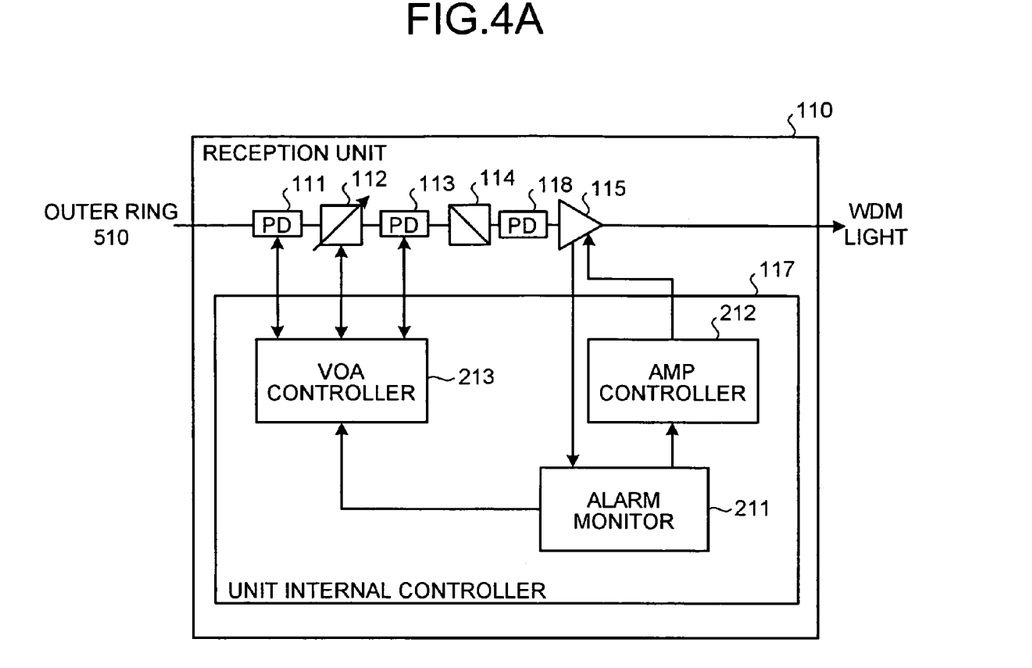
FIG. 4A is an explanatory diagram of another configuration of the unit controller.

FIG. 4A is an explanatory diagram of the configuration of the unit controller 117. As shown in FIG. 4A, the unit controller 117 includes an alarm monitor 211, an AMP controller 212, and a VOA controller 213.

The alarm monitor 211 monitors whether the preamp 115 has been started. When the preamp 115 does not start in a predetermined time period, the alarm monitor 211 outputs an alarm indicating a starting abnormality of the preamp 115 to the AMP controller 212 and the VOA controller 213.

Upon receiving the alarm from the alarm monitor 211, the AMP controller 212 outputs a re-start instruction to the preamp 115. Upon receiving the alarm from the alarm monitor 211, the VOA controller 213 outputs an adjustment instruction to the VOA 112.

Figure 4B:
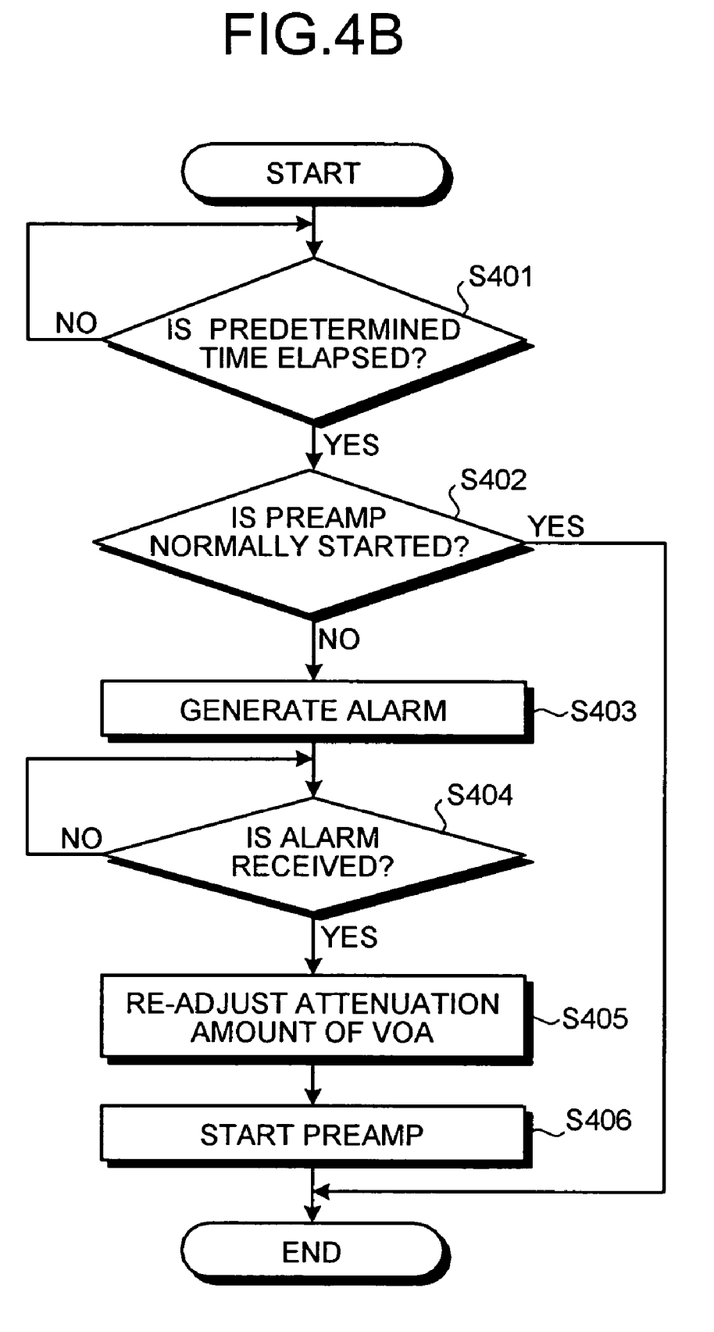
FIG. 4B is a flowchart of a re-adjustment process performed by the unit controller shown in FIG. 4A.

FIG. 4B is a flowchart of a re-adjustment process of the attenuation amount of the VOA 112 performed by the unit controller 117 shown in FIG. 4A. The alarm monitor 211 judges whether a predetermined time has elapsed (step S401). When the predetermined time elapses (step S401: Yes), the alarm monitor 211 judges whether the preamp 115 has normally started (step S402).

When the preamp 115 normally starts (step S402: Yes), the process is ended there because the re-adjustment of the VOA 112 is not necessary. On the other hand, when the preamp 115 does not normally start (step S402: No), an alarm is generated by the alarm monitor 211 because the re-adjustment of the VOA 112 is necessary (step S403).

The AMP controller 212 and the VOA controller 213 judge whether they have received the alarm (step S404). Upon receiving the alarm (step S404: Yes), the VOA controller 213 outputs an instruction for re-adjustment to the VOA (step S405), and the AMP controller 212 outputs an instruction to start the preamp 115 (step S406). The process of step S405 and the process of step S406 can be performed simultaneously.

Thus, the VOA 112 is re-adjusted by the unit controller 117. Subsequently, as in the same manner as the conventional starting procedures, the shut-down state of the preamp 115 of the optical transmission device 100B is released and the preamp 115 is started. When confirming that the preamp 115 has started, the unit controller 117 stops sending the ASE light output request. When the ASE light stops, the unit controller 123 closes the 1×2 SW 124 arranged upstream of the postamp 121 and starts operation.

According to the embodiment explained above, even when the level of the optical signal fluctuates after the attenuation amount of the VOA is adjusted by the OSC, the attenuation amount is re-adjusted by the unit controller without the aid of OSC, thereby preventing erroneous operation, which is due to a level change of the optical signal, in starting procedure of the optical transmission device.

According to the embodiment explained above, the level of the optical signal input into the preamp 115 is adjusted to fall within the dynamic range of the preamp 115. However, for example, an input level to the optical reception unit can be adjusted if the optical transmission device does not include any amplifier.

According to the embodiment explained above, the optical transmission device 100A/100B includes the OSCs 130 and 140, the OSC branching coupler 114, and the OSC multiplexing coupler 122 for an optical transmission of an OSC signal. However, these components are not indispensable to the optical transmission device 100A/100B.

The optical level control method explained in the above embodiment can be realized, for example, by storing a prepared computer program in the FPGA in the AMP unit.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical transmission device, comprising:
   an attenuator attenuating an optical signal by a predetermined attenuation amount;
   a controller performing an adjustment of the predetermined attenuation amount so that a level of the attenuated optical signal, to be input into a preamp, falls within a predetermined dynamic range of the optical element and performs a re-adjustment of the predetermined attenuation amount when a difference between a target input level and a preamp input level is greater than a threshold value in a predetermined time period after the adjustment; and
   an adjuster adjusting a level of the attenuated optical signal input into the preamp,
   wherein the adjustment and the re-adjustment are performed, using an amplified spontaneous emission (ASE) light, in a gain setting at a start-up of the optical transmission device.

2. The optical transmission device according to claim 1, further comprising a detector that detects the level of the optical signal input into the optical element, wherein the controller includes:
   an input-value storage unit that stores the level of the optical signal, detected by the detector, as an input value;
   a target-value storage unit that stores a predetermined target value;
   a comparator that compares the input value with the predetermined target value; and
   an attenuator controller that adjusts the predetermined attenuation amount based on a comparison result of the comparator.

3. The optical transmission device according to claim 1, wherein the controller includes:
   a detector that detects a starting abnormality of the optical element;
   an optical-element controller that restarts the optical element when the starting abnormality is detected; and
   an attenuator controller that re-adjusts, when the starting abnormality is detected, the predetermined attenuation amount so that the level of the attenuated optical signal, to be input into the optical element, falls within the predetermined dynamic range of the optical element.

4. The optical transmission device according to claim 1, wherein the optical element is an optical amplifier.

5. A method of attenuating an optical signal, comprising:
   attenuating the optical signal by a predetermined attenuation amount;
   adjusting the predetermined attenuation amount so that a level of the attenuated optical signal, to be input into a preamp, falls within a predetermined dynamic range of the optical element and performing a re-adjustment of the predetermined attenuation amount when a difference between a target input level and a preamp input level is greater than a threshold value in a predetermined time period after the adjustment; and
   adjusting a level of the attenuated optical signal input into the preamp,
   wherein the adjustment and the re-adjustment are performed, using an amplified spontaneous emission (ASE) light, in a gain setting at a start-up of the optical transmission device.

6. The method according to claim 5, further comprising detecting the level of the optical signal input into the optical element as an input value, wherein the adjusting includes adjusting the predetermined attenuation amount based on a comparison result of the input value and a predetermined target value.

7. The method according to claim 5, wherein the adjusting further comprises:
   detecting a starting abnormality of the optical element;
   restarting the optical element when the starting abnormality is detected; and
   adjusting, when the starting abnormality is detected, the predetermined attenuation amount so that the level of the attenuated optical signal input into the optical element falls within the predetermined dynamic range of the optical element.

8. The method according to claim 5, wherein the optical element is an optical amplifier.

9. A computer-readable recording medium that stores a computer program readable by the computer to control the computer for attenuating an optical signal, by: attenuating the optical signal by a predetermined attenuation amount;
   adjusting the predetermined attenuation amount so that a level of the attenuated optical signal, to be input into a preamp, falls within a predetermined dynamic range of the optical element and performing a re-adjustment of the predetermined attenuation amount when a difference between a target input level and a preamp input level is greater than a threshold value in a predetermined time period after the adjustment; and
   adjusting a level of the attenuated optical signal input into the preamp, wherein
   the adjustment and the re-adjustment are performed, using an amplified spontaneous emission (ASE) light, in a gain setting at a start-up of the optical transmission device.

10. A method of attenuating an optical signal, comprising:
    attenuating the optical signal by a predetermined attenuation amount;

adjusting the predetermined attenuation amount by the OSC and performing a re-adjustment of the predetermined attenuation amount without the aid of OSC, when a difference between a target input level and a preamp input level exceeds a threshold in a predetermined time period after the adjustment.

* * * * *